Figure 1:
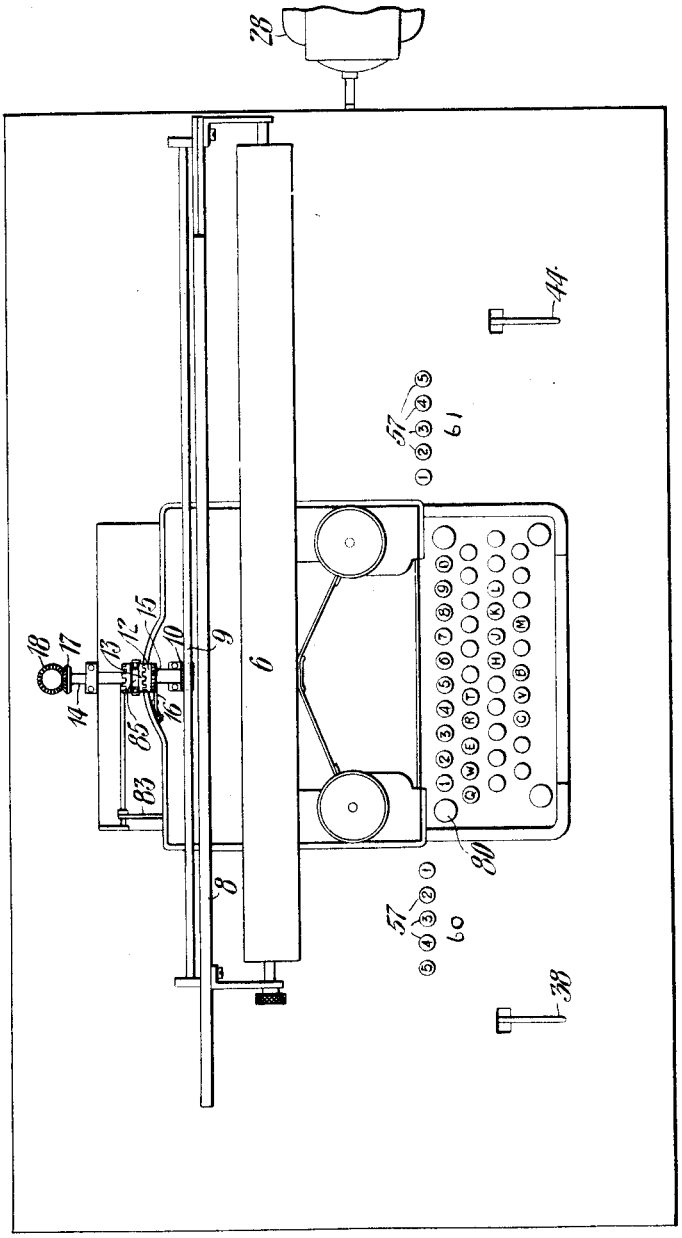

S. E. CARLIN.
TYPE WRITING MACHINE.
APPLICATION FILED FEB. 24, 1913.

1,132,558.

Patented Mar. 23, 1915.
9 SHEETS—SHEET 1.

WITNESSES:

INVENTOR:
Samuel E. Carlin
BY
ATTORNEY.

S. E. CARLIN.
TYPE WRITING MACHINE.
APPLICATION FILED FEB. 24, 1913.

1,132,558.

Patented Mar. 23, 1915.

9 SHEETS—SHEET 4.

WITNESSES:

INVENTOR:
Samuel E. Carlin
BY
ATTORNEY

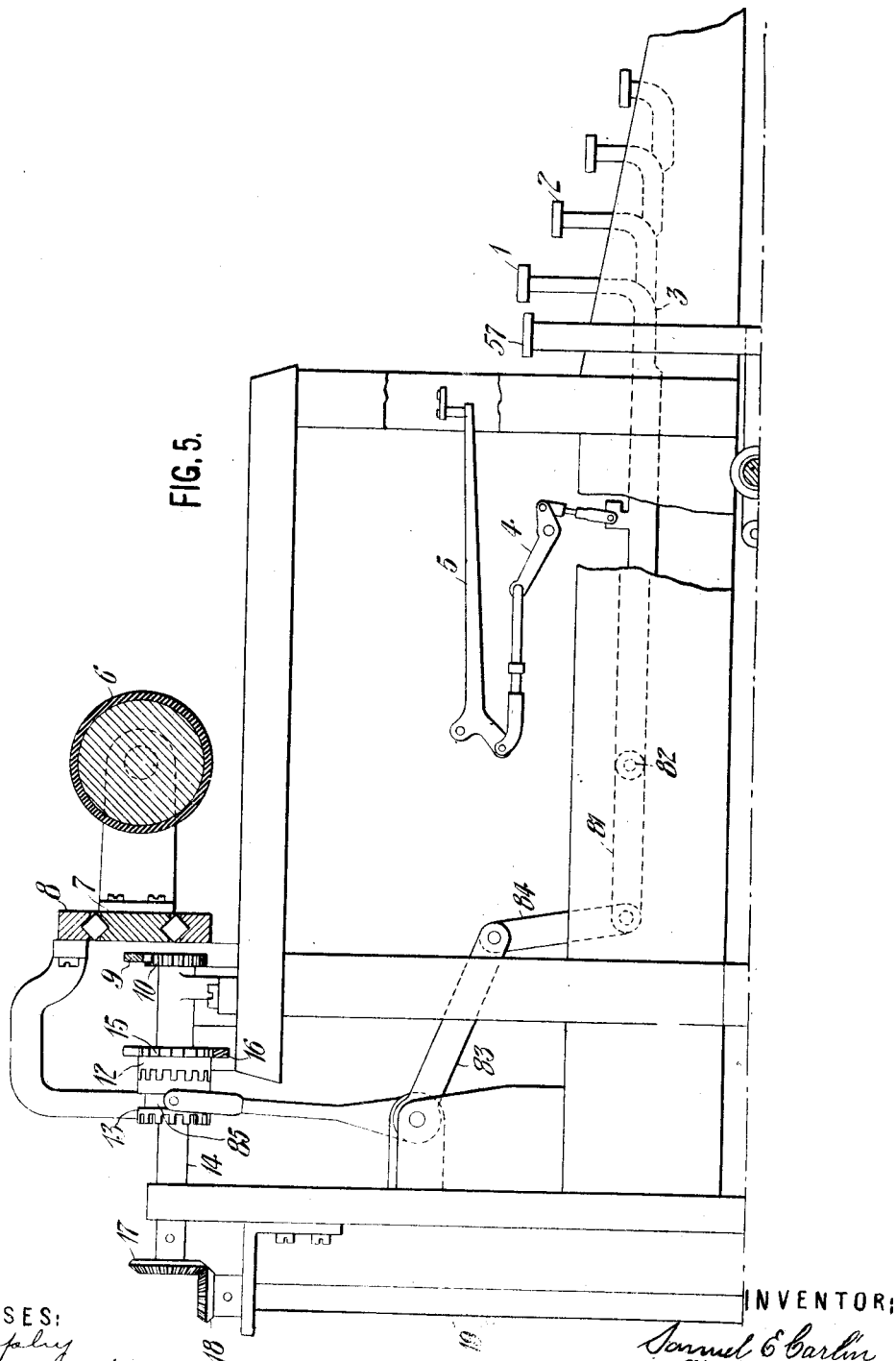

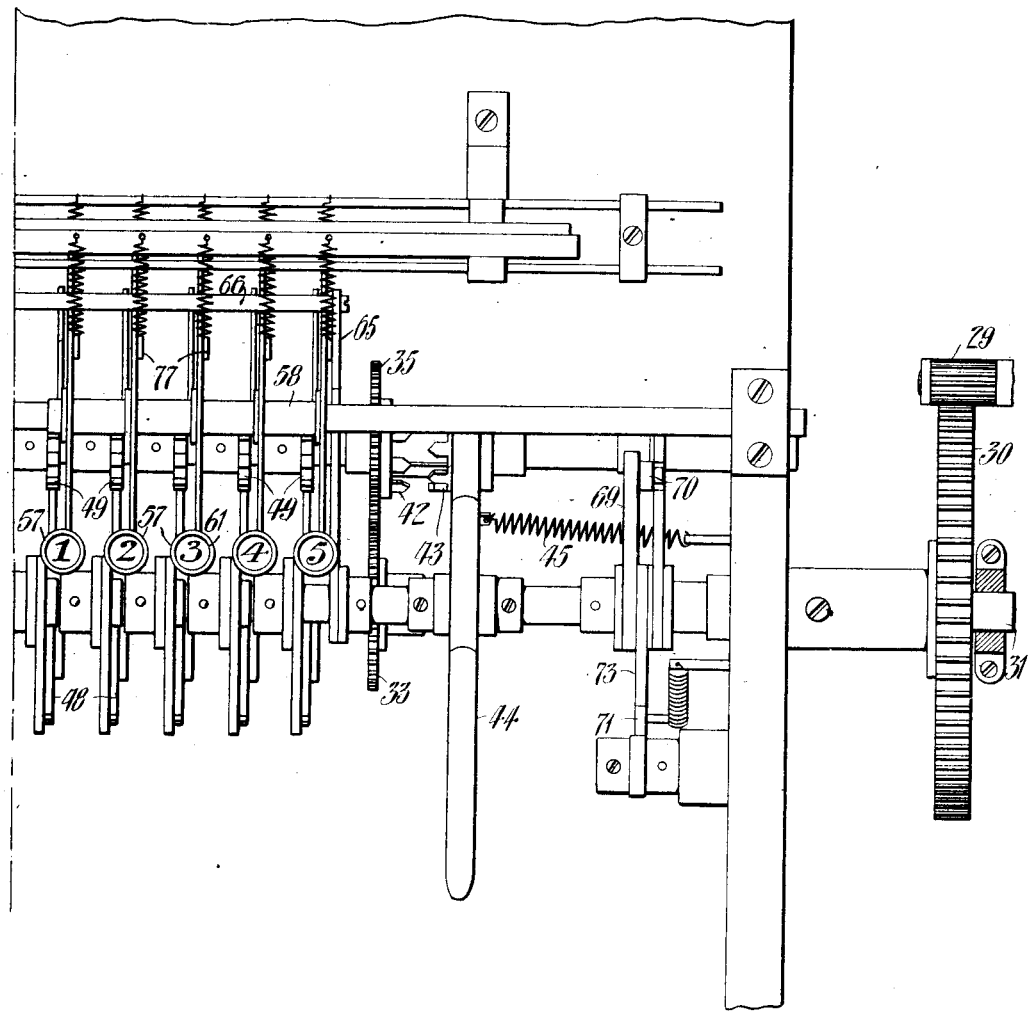

S. E. CARLIN.
TYPE WRITING MACHINE.
APPLICATION FILED FEB. 24, 1913.

1,132,558.

Patented Mar. 23, 1915.
9 SHEETS—SHEET 7.

WITNESSES:
J. A. Brophy
Titus H. Irons

INVENTOR:
Samuel E. Carlin
BY
D. C. Stickney
ATTORNEY

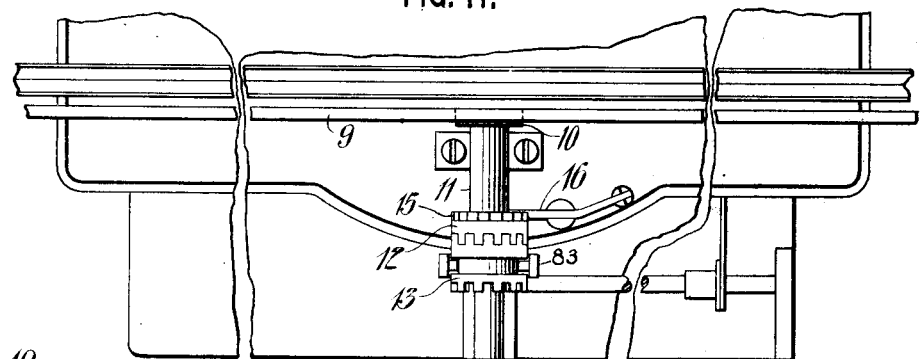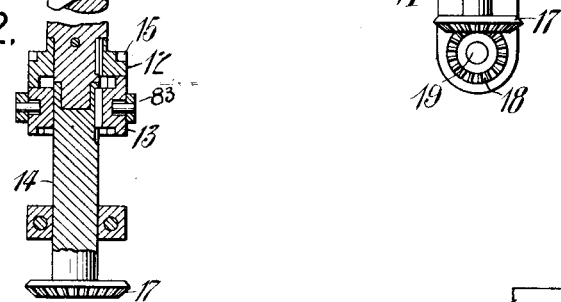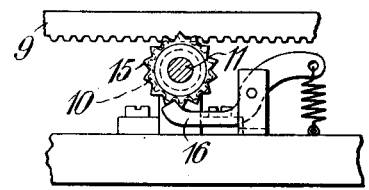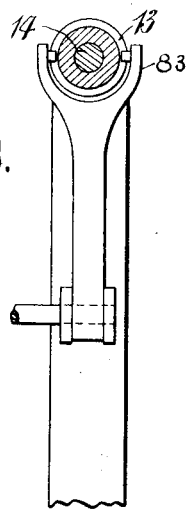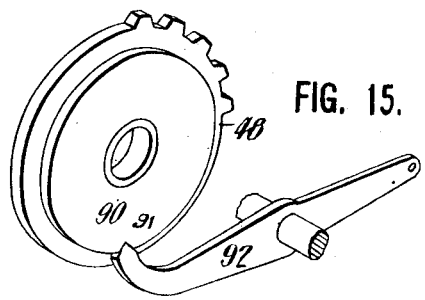

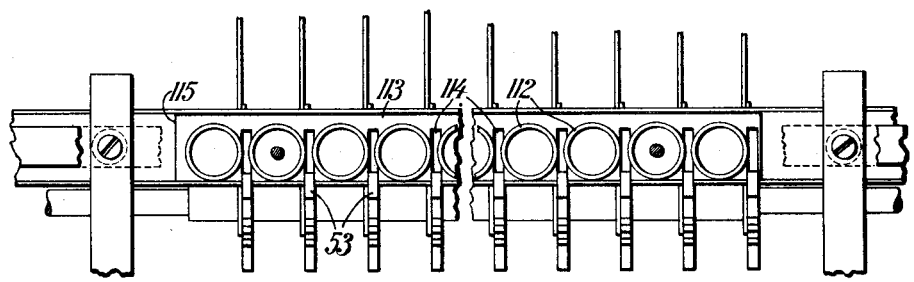
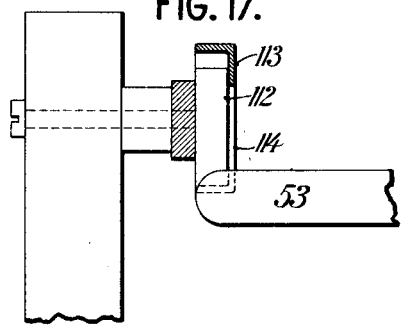
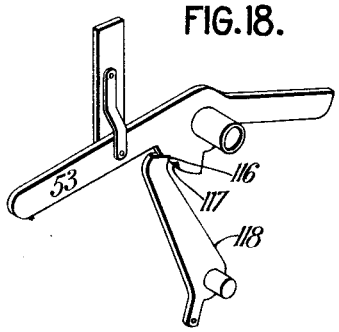

UNITED STATES PATENT OFFICE.

SAMUEL E. CARLIN, OF CHICAGO, ILLINOIS, ASSIGNOR, BY MESNE ASSIGNMENTS, TO UNDERWOOD COMPUTING MACHINE COMPANY, OF NEW YORK, N. Y., A CORPORATION OF NEW YORK.

TYPE-WRITING MACHINE.

1,132,558.     Specification of Letters Patent.     Patented Mar. 23, 1915.

Original application filed June 26, 1909, Serial No. 504,595. Divided and this application filed February 24, 1913. Serial No. 750,065.

*To all whom it may concern:*

Be it known that I, SAMUEL E. CARLIN, a citizen of the United States, residing in Chicago, in the county of Cook and State of Illinois, have invented certain new and useful Improvements in Type-Writing Machines, of which the following is a specification.

This invention relates to a mechanism for tabulating and feeding the typewriter carriage, so as to bring any desired point of a written line opposite to the printing point of the typewriter, and is a division of my application No. 504,595, filed June 26, 1909.

A feature of this invention is the provision of mechanism to enable the spacing or traversing of the carriage definite predetermined distances and selectively either to the right or to the left. To accomplish this feature, there are provided two series of tabulating keys, one for spacing the carriage to the right and the other for spacing the carriage to the left. These keys control the connection of mutilated gears to a source of power, whereby these mutilated gears when so connected may drive gearing connected to traverse the carriage either to the right or to the left according to the particular series to which the key actuated belongs. The mutilated gears have varying numbers of teeth starting with one for one letter-space movement of the carriage, and ascending in regular order by an increment of one tooth corresponding to the several tabu-lating keys from one to the highest number, and in this instance, 5. That is to say, the mutilated gear corresponding to the "2" key has two teeth, and to the "3" key, three teeth, and so on.

A further feature of this invention is the provision of traversing mechanism for the carriage, to enable the movement of the carriage any desired undetermined distance in a continuous manner and either to the right or to the left. This end is accomplished by the provision of two clutches, which are normally ineffective but can be made effective to connect the aforesaid source of power in driving relation with the carriage. By the connection of one clutch, the carriage will be traversed to the left, and by the connection of the other clutch, it will be traversed to the right. So long as either one of the clutches is held in operation, the carriage will be moved by the source of power and will stop only when the clutch is released.

A further feature of this invention is the provision of means to interrupt the control of the movement of the carriage from the source of power. This may be accomplished by the provision of a clutch in the driving train connecting the source of power to the carriage, which may be thrown out of operation temporarily by the depression of a special key provided adjacent the other keys of the keyboard.

A still further feature of this invention is the provision of means to enable the normal step-by-step letter-feeding movement of the carriage to be accomplished from the source of power at the striking of any alphabet key. This is accomplished by the provision of a universal bar, which at the operation of any alphabet key, enables the connection of one of the single-tooth mutilated gears with the source of power to provide a single letter-spacing movement of the carriage.

Other features and advantages will hereinafter appear.

Figure 2:
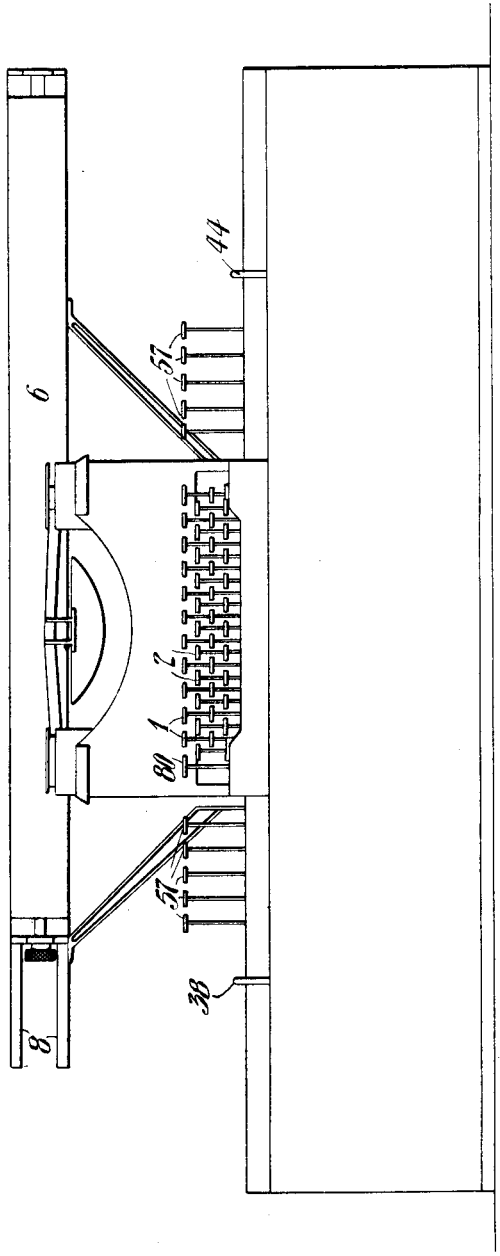
Figure 3:
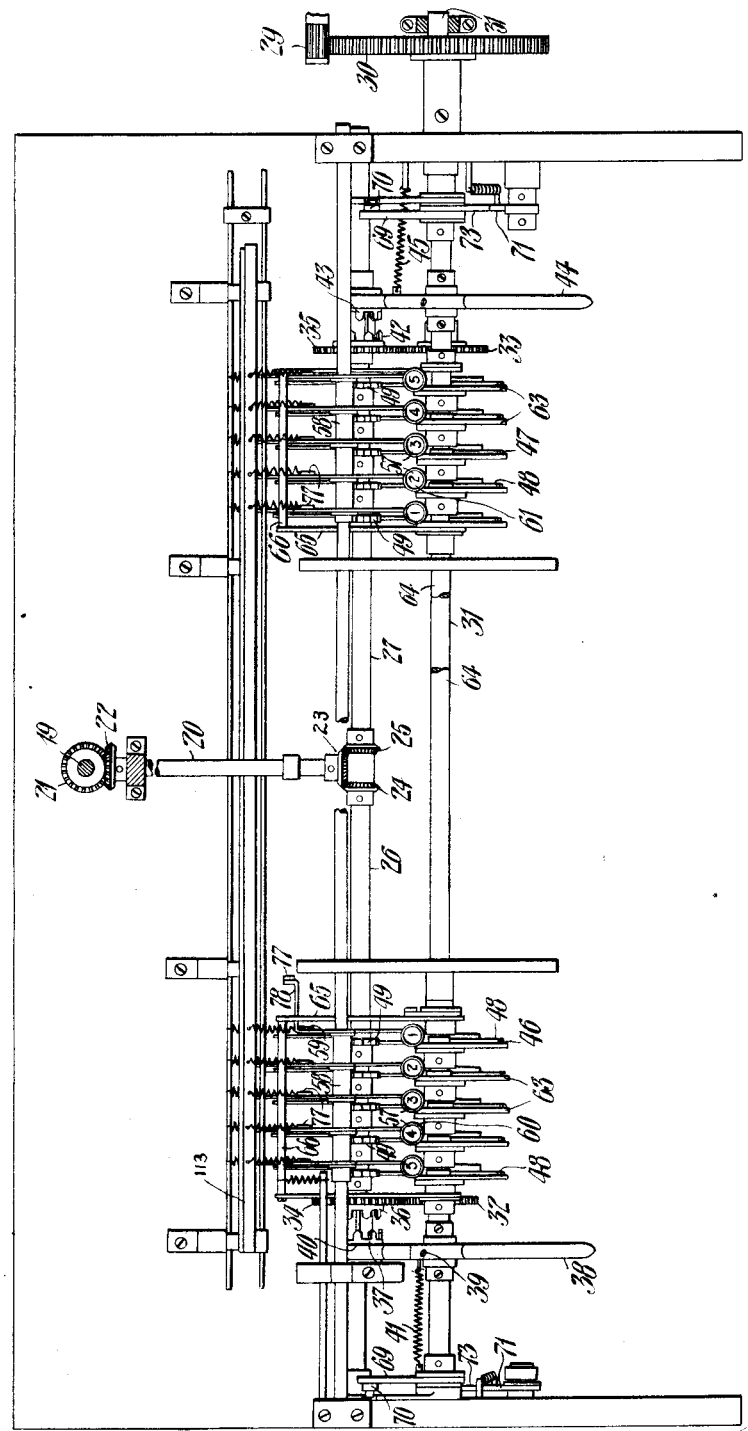
Figure 4:
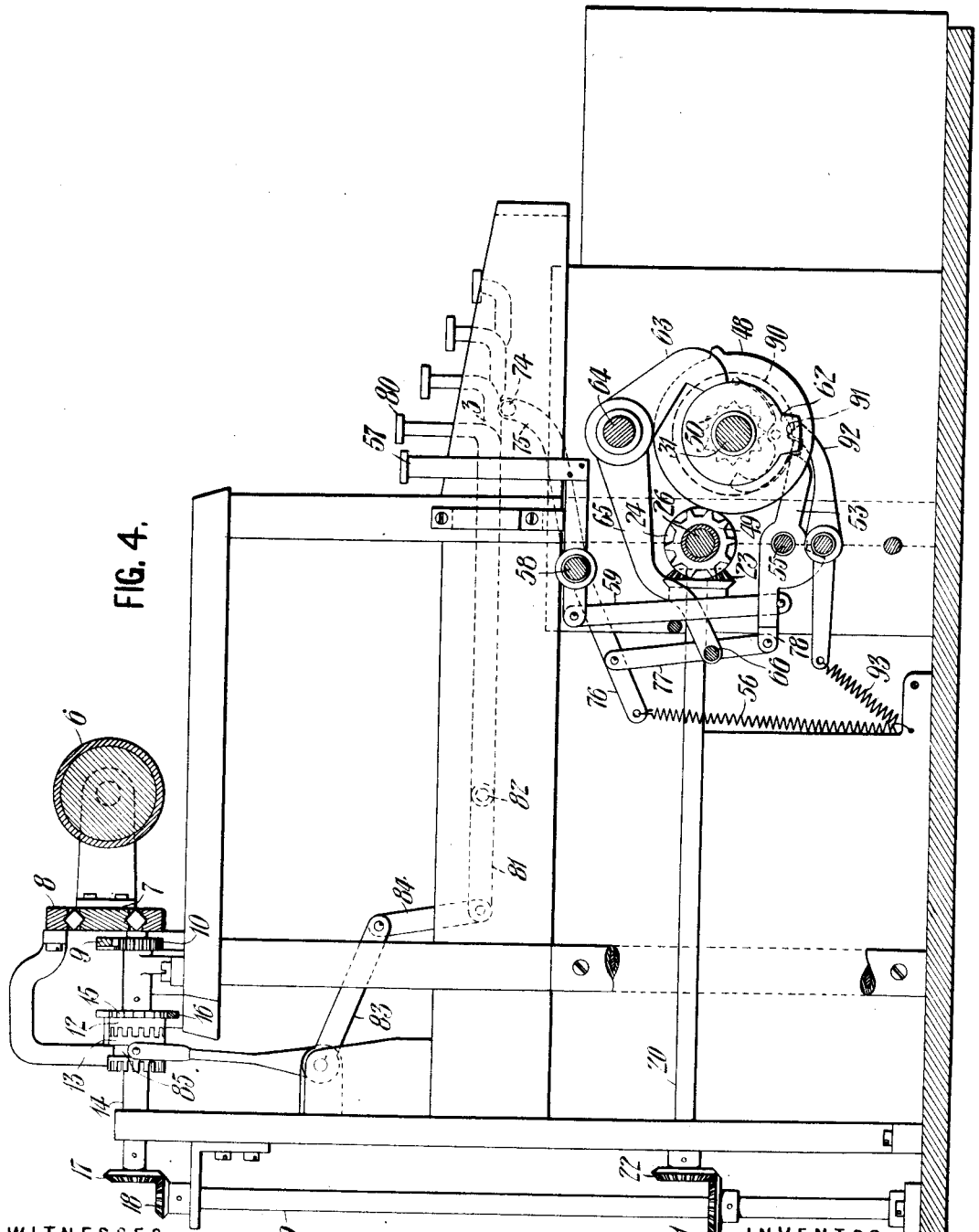
Figure 8:
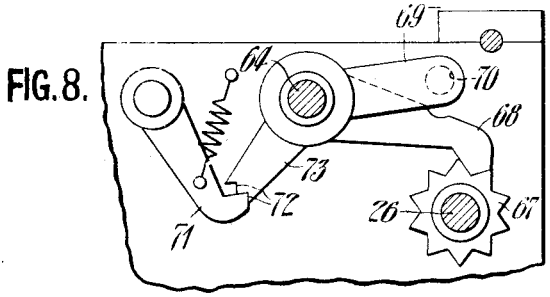
Figure 9:
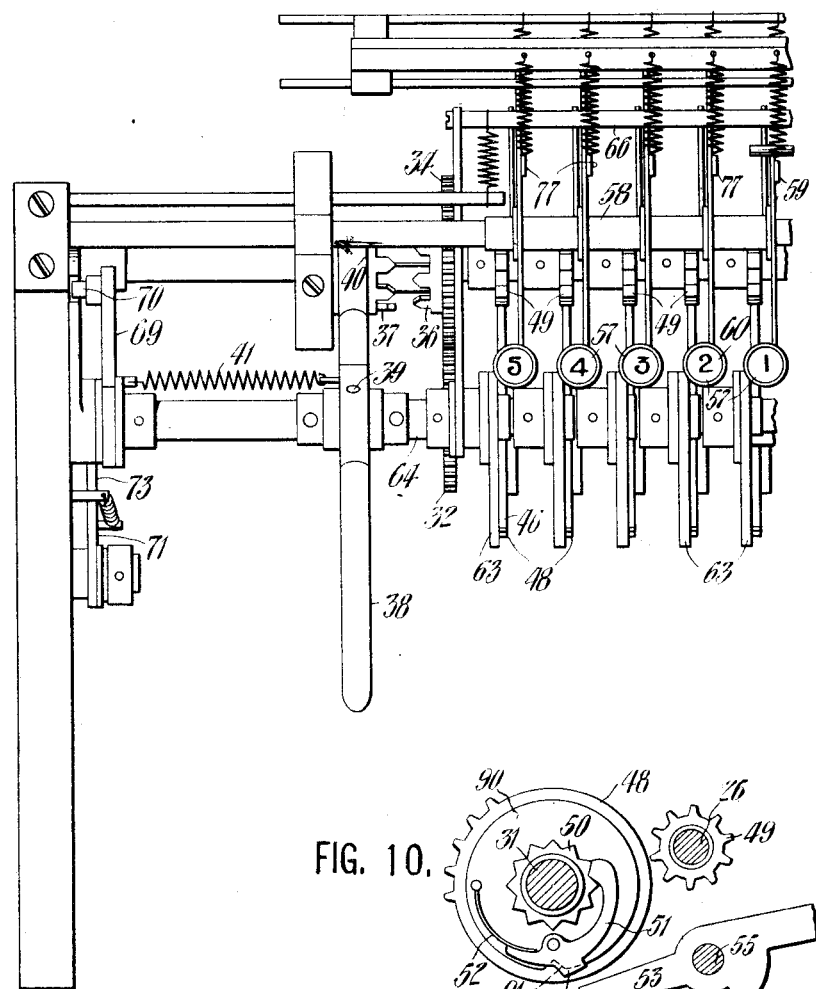
Figure 10:
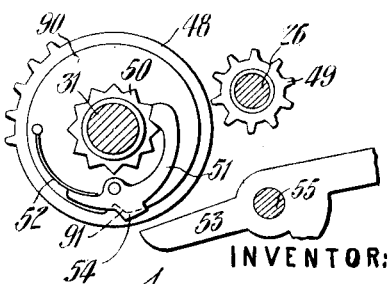

In the accompanying drawings Figure 1 is a top plan view. Fig. 2 is a front view in elevation. Fig. 3 is a diagrammatic skeleton view showing the carriage-spacing and traversing mechanism in top plan with parts broken away to show the underlying structure. Fig. 4 is a vertical section taken from front to rear, with parts omitted for simplicity. Fig. 5 is an enlarged vertical section from front to rear showing the type action. Fig. 6 is an enlarged fragmentary top plan view of the right-hand portion of the machine, showing the means for spacing the carriage to the right. Fig. 7 is a detail perspective view, showing one of the mutilated gears with its associated cam, and in this instance, a mutilated gear which corresponds to the spacing of the carriage a single letter space. Fig. 8 is a detail vertical section in elevation, showing the locking means for preventing an overthrow of one of the drive shafts. Fig. 9 is a view similar to Fig. 6, with the exception that it shows the left-hand portion of the machine and the mechanism corresponding to the spacing and traversing of the carriage to the left. Fig. 10 is a detail sectional view, showing the relation of one of the mutilated gears to the shaft which it drives and the clutch for connecting it to the shaft which drives it; in this instance, the mutilated gear corresponding to a spacing of the carriage five letter spaces is shown and has five teeth. Fig. 11 is a fragmentary top plan view, showing the clutch for silencing the traversing mechanism for the carriage. Fig. 12 is a detail horizontal section of the clutch shown in Fig. 11. Fig. 13 is a vertical section through the shifting mechanism for the clutch shown in Figs. 11 and 12. Fig. 14 is a fragmentary view in elevation, showing the driving connection between the rack on the carriage and the pinion for the same and also showing the detent for preventing overthrow of this mechanism, so as to insure the proper positioning of the carriage at each letter space. Fig. 15 is a detail perspective view showing one of the mutilated gears with the notched disk thereon for determining the stopping point of the mutilated gear so as to prevent overthrow. Fig. 16 is a contracted detail view in elevation showing the locking means for preventing the connection of more than one mutilated gear to the continuously-rotating shaft, with the possible exception of the single-tooth normal letter-space mutilated gear. Fig. 17 is an enlarged detail view in vertical section taken from front to rear of the machine, showing the relation of one of the trippers to the locking rings or rollers. Fig. 18 is a detail perspective view of one of the trippers. Fig. 19 is a vertical section through the connection of one of the trippers to its actuating link. Fig. 20 is a detail perspective view of one of the locking rings or rollers.

Numeral keys 1 and alphabet keys 2 depress key levers 3 (Fig. 5), to actuate through the intermediary of linkages 4, type bars 5, swinging them up rearwardly against the front side of a platen 6, mounted to rotate on a carriage 7 which slides right and left in guides 8. The carriage 7 is provided, at its rear, with a rack 9, by means of which it may be traversed either to the right or left.

Engaging with the rack 9 to drive the same, there is provided a pinion 10, mounted on a shaft 11 (Figs. 11 and 12). The shaft 11 has secured thereto, a clutch member 12, which is normally engaged by a slidable clutch 13, to connect the shaft 11 in driven relation with a shaft 14 on which the clutch 13 is splined. It will be noted in passing that the clutch member 12 is also provided with a detent ratchet wheel 15, engageable by a spring-pressed detent 16 (Fig. 14), which has a number of teeth such that the detent 16 will accurately determine the position of the carriage for each letter space.

The shaft 14 is provided, at its rear end (Figs. 11, 4 and 5), with a bevel gear 17 meshing with a companion bevel gear 18 on a vertical shaft 19, which is driven from a shaft 20 by means of a pair of companion gears 21 and 22 secured, respectively, to the shafts 19 and 20. Also secured on the shaft 20, at its forward end, there is provided a bevel gear 23 (Figs. 3 and 4), which meshes with a pair of bevel gears 24 and 25, facing in opposite directions and secured, respectively, on shafts 26 and 27. It will thus be seen that when the shaft 26 is rotated to drive the shaft 11 through the intermediary of the shafts 20, 19, 14 and the connected gearing, the pinion 10 will be driven in one direction to traverse the carriage 7 in one direction, but that when the shaft 27 is driving, the pinion 10 will be driven in the opposite direction to traverse the carriage in the opposite direction. As the gearing is arranged when the shaft 26 is rotated, the carriage 7 will be traversed toward the left in a letter-feeding direction, and when the shaft 27 does the driving, the carriage 7 will be traversed to the right in a return direction.

The shafts 26 and 27 receive their drive from a common source of power indicated by an electric motor 28 (Fig. 1). This electric motor 28 is provided with a pinion 29 which meshes with a gear 30 secured to a shaft 31, so that the shaft 31 is continuously rotated. The shafts 26 and 27 receive their rotation from the shaft 31 in a number of ways. The first way to be considered will be whereby the shafts may be driven continuously an undetermined amount so as to space the carriage an undetermined amount either to the right or to the left. To accomplish this, the shaft 31 has secured thereto, a pair of gears 32 and 33, which mesh, respectively, with gears 34 and 35, mounted respectively and loosely on the shafts 26 and 27. It will thus be seen that the gears 34 and 35 are continuously rotated but that they are not normally connected to their respective shafts 26 and 27. If, then, it is desired to traverse the carriage to the left, that is, to drive the shaft 26, it is necessary to connect the gear 34 positively to the shaft 26. To accomplish this, the gear 34 is provided with a toothed clutch 36, into engagement with which may be brought a corresponding clutch 37 splined on the shaft 26, so as to be fixed against rotation relative thereto. To move the clutch into engagement with the clutch 36, there is provided a control shifting lever 38, which is pivotally mounted intermediate its ends, as at 39, and engages in an annular groove 40 on the clutch 37. The lever 38, however, is normally held in such a position that the clutch 37 will be disengaged from the clutch 36 by a spring 41. In order then to traverse the carriage to the left an undetermined distance, the lever 38 must be swung about its pivot against the tension of the spring 41, so as to bring the teeth of the clutch 37 into mesh with the teeth of the clutch 36, when there will be effected a continuous drive from the motor 28 to the pinion 10, so that the carriage will be traversed to the left until the operator's hand is disengaged from the control lever. The spring 41 then will automatically break the connection, permitting the detent 16 to lock the carriage in whatever position it has been adjusted to and exactly corresponding to a letter space. Similarly the gear 35 may be locked to the shaft 27 by interlocking clutch members 42 and 43, the latter of which is splined on the shaft 27 and shiftable by a control shifting lever 44. In this instance also, the lever 44 is held by a spring 45 in such a position that the clutch elements 42 and 43 will normally be disengaged from each other. It is, of course, understood that the clutch lever 44 controls the shifting of the carriage to the right an undetermined distance, which depends on the period of time which the operator holds the clutch elements 42 and 43 in engagement with each other against the tension of the spring 45. In addition to undetermined movements of the carriage, provision is made for accurately predetermined movements of the carriage to the right or left. For this purpose, the shaft 31 is provided with two series 46 and 47 of mutilated gears 48. The series 46 is used to space the carriage toward the left and the series 47 is used to space the carriage toward the right. In this instance there are five mutilated gears in each series and each gear in a series is different from any other gear. That is to say, there is in each series a mutilated gear having one tooth; another having two teeth; still another having three teeth, and so on, increasing by as many increments as there are gears, up to the number of spaces which it may be desired to move the carriage at one stroke of the key, which in this instance is shown to be five. The mutilated gears 48 (Figs. 4, 7 and 10) are loosely mounted on the shaft 31, so that they are not normally driven thereby. Each one, however, can be individually clutched to the shaft 31, so as to be driven thereby. When so clutched to the shaft, it will rotate therewith so as to bring the teeth thereof in mesh with the teeth of full gears 49 secured on the shafts 26 and 27. There is one of these gears 49 fixed on the shaft 26 for each of the mutilated gears 48 in the series 46. There is likewise one of these gears 49 secured on the shaft 27 for each of the mutilated gears 48 in the series 47. It will thus be seen that when a mutilated gear is clutched in driven relation with the shaft 31, it will drive the opposite gear 49 an amount corresponding to the number of teeth which it has. That is to say, if a one-tooth mutilated gear 48 is clutched to the shaft 31, it will rotate the gear 49 with which it meshes, one single step or tooth-space; correspondingly, a two-tooth mutilated gear will rotate the meshing gear 49, two steps or tooth-spaces, and so on. In this way, if it is desired to space the carriage definitely one, two, three, four or five spaces to the left, the corresponding mutilated gear in the series 46 will be clutched to the shaft 31, so as to drive the shaft 26 a corresponding amount, whereby the pinion 10 will be rotated in such a direction and such an amount as to space the carriage 7 to the left the required distance. If it is desired to space the carriage to the right a definite distance, one of the mutilated gears in the series 47 will be clutched to the shaft 31 to drive the shaft 27.

In order to connect any one of the mutilated gears 48 so that it will rotate with the shaft 31, there is provided adjacent each of these mutilated gears, a clutch star wheel 50, which is secured to the shaft 31, thereby always rotating with the shaft. Pivotally mounted on each of the mutilated gears 48, there is provided a clutching pawl 51, which is normally urged by a spring 52, so that it tends to engage the star wheel 50 for the purpose of clutching the corresponding mutilated gear 48 to the shaft 31. This clutching engagement, however, is normally prevented by disconnecting trippers or triggers 53, of which there is one for each mutilated gear and the nose of which lies in the path of a lug or projection 54 on the associated pawl 51. The position and relation of the tripper or trigger 53 to the pawl 51, is such that any tendency of the mutilated gear 48 to rotate with the shaft 31, will cause the tripper or trigger 53 to swing the pawl 51 about its pivot against the tension of the spring 52, so as to disconnect the clutching pawl 51 from the clutching star wheel 50. If, however, a disconnecting tripper or trigger 53 should be swung about its pivot 55 to such a position that the nose of the tripper or trigger would be moved away from the lug 54, then the spring 52 would be permitted to act, forcing the pawl 51 into clutching engagement with the star wheel 50, so that its associated mutilated gear 48 would be connected in driven relation with the shaft 31. Inasmuch as the trippers or triggers 53 are normally held by springs 56 in such a position that the toes thereof will engage the lugs 54, it is necessary to forcibly rock the trippers or triggers against the tension of the springs. To accomplish this, there is provided for each mutilated gear, a tabulating key 57, which is pivotally mounted as at 58 and connected to the associated tripper or trigger by a link 59. The keys 57 are arranged in two series 60 and 61, corresponding to the spacing of the carriage to the left and right, respectively. These keys are numbered from "1" to "5" in each series, according to the number of teeth on the associated mutilated gears and according to the number of letter spaces which they will space the carriage when struck. In order that the trippers or triggers 53 will come into the path of the lugs 54, so as to permit solely one rotation of a mutilated gear with the shaft 31 for a depression of the corresponding key 57, there is provided positive means for rocking the trippers or triggers 53 back to their effective position.

Connected to each of the mutilated gears 48, there is provided a cam 62, which will rotate with the associated gear so that after the teeth thereon have performed their work, this cam will engage an arm 63 in each instance, so as to rock a shaft 64. That is to say, when any one of the mutilated gears is connected to the shaft 31, so as to rotate therewith, one of the arms 63 will be actuated to rock the shaft 64. Secured on the shaft 64 are also provided two pairs of arms 65, each pair being connected by a transverse bar 66, which is universal to all of the trippers or triggers 53 in a set. When the shaft 64 is rocked, both these bars 66 will engage the tail end of said triggers or trippers 53, so as to rock them about their pivots, and thus insure the bringing of the toes thereof into the path of the corresponding lugs 54 on the pawls 51. This positively insures the stopping of the mutilated gears after a single rotation for each depression of the associated tabulating key 57. To prevent overthrow of each of the mutilated gears, there is secured thereto, as will be seen by reference to Fig. 15, a disk 90, having a notch 91 therein which is engaged by a dog or detent 92 when the associated mutilated gear finishes its movement by being disconnected from the shaft 31. The dogs or detents 92 are normally held in a position to engage the notches by individual springs 93. The rock shaft 64 is also used to prevent overthrow of the shafts 26 and 27. For this purpose, these shafts are each provided at their left and right ends, respectively, with a detent wheel 67, engaged by a detent 68 (Fig. 8) loosely mounted on the rock shaft 64. On each end of the rock shaft 64, there is provided an arm 69, with a projecting pin 70, which overlies the associated detent 68, so as to force it into locking engagement with the associated detent wheel 67 on the corresponding one of the shafts 26 and 27. Each detent 68 is locked in its in and out positions by a spring-pressed pawl 71, which engages either one of a pair of notches 72 on an arm 73 secured to and forming a part of the detent 68 in each case.

It is, of course, necessary to obtain a spacing of the carriage in the normal letter-feeding direction at the actuation of any of the character keys. The numeral keys space in a manner not shown in this application but described and claimed in my above-mentioned application, No. 504,595. In the case of the other keys, such as the alphabet keys 2, there is provided a universal bar 74, which underlies all of the levers 3 of these keys, so as to be depressed when any one of these keys is depressed. This universal bar connects arms 75, which are mounted to rock on the shaft 58. One of the arms 75 extends beyond its pivot point, as at 76, where it is connected by a link 77 to an offset 78 of the particular tripper or trigger 53 which coöperates with the single-tooth mutilated gear 48 in the series of mutilated gears 46. That is to say, it coöperates with the mutilated gear which will cause a single letter-space movement of the carriage toward the left. It will thus be seen that when any one of the alphabet keys is depressed to strike a character, it will cause a single letter-space movement of the carriage to the left, and the universal bar 74 and the trippers or triggers 53 will be returned to their normal position by one of the springs 56. If for any reason it is desired to render the carriage independent of the controlling mechanism therefor, it will be merely necessary to depress a key 80, to rock a lever 81 about its pivot 82, so as to rock a bell crank shifting lever 83 through the intermediary of a connecting link 84. The shifting lever 83 is forked at its opposite end to engage in an annular groove 85 provided in the clutch 13. This clutch is normally held in engagement with the opposite clutch 12 by a spring but will be thrown out of engagement therewith when the key 80 is depressed. Inasmuch as when the clutch 13 is disengaged from the clutch 12 the drive between the shaft 14 and the shaft 11 will be interrupted, the carriage 7 will remain stationary in spite of the manipulation of any of the parts of the carriage-spacing controlling mechanism. In order that the spacing of the carriage may be definite when any one of the keys 57 is depressed, provision is made whereby the mutilated gear of more than one key cannot be in action at the same time. For this purpose, all of the trippers or triggers 53 with the exception of the one coöperating with the one-tooth mutilated gear of the series 46, are extended at their tail ends to such an extent that when they are rocked, these tail ends will pass between a pair of locking rings or rollers 112. These locking rings 112 are loosely mounted in a run-way or guideway 113, and the tails of the trippers 53 are arranged in alinement with the slots 114 in this guideway, so that they can pass up into the same to spread apart the nearest two of these rings. The runway or guideway 113 is blocked at its ends, as at 115, to prevent more than a given movement of the rings, so that while there is sufficient space for one tripper 53 to enter between two rings, this will crowd the other rings together, so as to close up the spaces therebetween, preventing the intrusion of any of the other trippers 53. It will thus be seen that by this means, after one tripper is actuated and in its ineffective position, then no other tripper can be actuated until the one in play has returned to its normal position. Each of the trippers may be provided with a pair of notches 116 and 117, which are engaged by a detent 118 to yieldingly detain the tripper in both of its adjusted positions.

The operation of the device will be readily understood when taken in connection with the above description. If it is desired to traverse the carriage so as to bring any particular point of the work-sheet opposite the printing point of the typewriter, this can be done my manipulating one of the levers 38 or 44, if the distance which it is desired to move the carriage is not exactly known. If the carriage is to be moved to the left, the lever 38 at the left will be manipulated, and if it is to be moved to the right, the lever 44 at the right will be manipulated. Each lever connects its particular shaft 26 or 27 in driven relation with the motor, so that the carriage will be driven toward the left or right according to which lever is operated. The movement will be continuous just so long as the lever is held against the tension of its spring, so as to maintain the associated clutch elements in engagement with each other. As soon as the particular lever is released, the drive will be automatically stopped and the carriage accurately locked at some particular letter space by the justifying detent 16. If, on the other hand, it is desired to space the carriage a given amount, as in tabulating, it is merely necessary to press one of the keys 57. If it is desired to space the carriage to the left, one of the keys in the series 60 would be actuated, the particular one being selected according to how many letter spaces it is desired to move the carriage. For example, if it is desired to space the carriage two spaces, the "2" key will be depressed; three spaces, the "3" key will be depressed, and so on. On the other hand, if it is desired to space the carriage toward the right, one of the keys at the right in the series 61 would be depressed, the particular one depending upon the number of spaces required, as in the case of the other series. In the ordinary operation of typewriting, the character keys 2 when struck will automatically cause a connection of the one-tooth mutilated gear in the series 46 to the shaft 31, so as to bring about a single letter-spacing movement of the carriage 7 to the left, that is, in a letter-feeding direction. If for any reason it is desired to disconnect the carriage from control by the levers 38 and 44 and the keys in the series 60 and 61, it is merely necessary to depress the key 80, when the clutch 13 will be disconnected from the clutch 12, to interrupt the drive between the motor and the pinion 10 which traverses the carriage.

Variations may be resorted to within the scope of the invention, and portions of the improvements may be used without others.

Having thus described my invention, I claim:

1. The combination with a carriage, of a source of power, and a driving train between said source of power and said carriage, said driving train having a series of different points of connection corresponding to different degrees of travel of said carriage.

2. The combination with a carriage, of a source of power, and a driving train for connecting said source of power to said carriage to enable the traversing of said carriage by said source of power, said train being normally inactive and having means for rendering it active at a plurality of points, said means varying in its effect at each of said points in a graded manner corresponding to different extents of movement of said carriage.

3. The combination with a carriage, of a motor for traversing said carriage, and a driving train for connecting said motor to said carriage, said train being normally inactive and having means for rendering it active at five points corresponding to one, two, three, four and five letter-space movements of said carriage.

4. The combination with a carriage, of a motor for traversing said carriage, and a driving train connecting said motor with said carriage, said train being normally inactive and having means for rendering it active at a plurality of points, one of which points corresponds to a single letter-space movement of said carriage, and the other points corresponding successively to increasing numbers of letter-space movements of said carriage, increasing by an increment of one letter-space.

5. The combination with a carriage, of a motor for traversing said carriage, and a driving train connecting said motor to said carriage, said train being normally inactive and including a drive shaft, a series of mutilated gears loosely mounted on said drive shaft and means for individually connecting said mutilated gears to said drive shaft to render said train active, said mutilated gears having varying numbers of teeth corresponding to different movements of said carriage.

6. The combination with a carriage, of a motor for traversing said carriage, and a driving train connecting said motor to said carriage, said train being normally inactive and including a drive shaft and a plurality of mutilated gears on said drive shaft, said mutilated gears having different numbers of teeth starting with a minimum and increasing in succession by an increment corresponding to a letter-space movement of said carriage.

7. The combination with a carriage, of a motor for traversing said carriage, and a driving train connecting said motor to said carriage, said train being normally inactive and including a drive shaft, a series of mutilated gears loosely mounted on said drive shaft, and means for connecting said mutilated gears individually to said drive shaft to render said train active.

8. The combination with a carriage, of a motor for traversing said carriage, a driving train connecting said motor to said carriage, said train being normally inactive and including a drive shaft, a series of mutilated gears loosely mounted on said drive shaft, and means for connecting said mutilated gears individually to said drive shaft, to render said train active; each of said mutilated gears having one tooth more than the gear next preceding corresponding to different extents of movement of said carriage, each of said teeth corresponding to a letter-space movement of said carriage.

9. The combination with a carriage, of a motor for traversing said carriage, and a driving train connecting said motor to said carriage, said train being normally inactive and including means to render it active at a plurality of points, each of said points corresponding to a different driving ratio between said motor and said carriage.

10. The combination with a carriage and a carriage-driving motor, of a normally-inactive driving train connecting said motor to said carriage, mechanism connected to said train for rendering it active to drive said carriage from said motor a single step at a time, and means independent of said mechanism for rendering said train active to drive said carriage from said motor a definite predetermined plurality of steps at a time.

11. The combination with a carriage, of a motor for traversing said carriage, and a driving train connecting said motor to said carriage, said train being normally inactive and including means for rendering it active, to effect a predetermined movement of said carriage, and mechanism insuring but a single action of said means at one time.

12. The combination with a carriage, of a motor for traversing said carriage, and a driving train connecting said motor to said carriage, said train being normally inactive and including means for rendering it active, and mechanism for insuring the disconnection of said means after a predetermined movement corresponding to a definite movement of said carriage.

13. The combination with a carriage, of a motor for traversing said carriage, a driving train connecting said motor to said carriage, said train being normally inactive and including means to render it active having a definite cycle corresponding to a given movement of said carriage, means for starting the action of said first-mentioned means, and mechanism for insuring the disconnection of said first-mentioned means after a completion of its cycle.

14. The combination with a carriage, of a motor for traversing said carriage, a driving train between said motor and said carriage, said train being normally inactive, means for rendering said train active for a period of operation corresponding to a definite plural number of letter-space movements of said carriage, and shifting means for determining whether said movement of said carriage shall be to the right or to the left.

15. The combination with a carriage, of a motor for traversing said carriage, a driving train between said motor and said carriage, said train being normally inactive so as to prevent the movement of said carriage by said motor, and selective means for rendering the train active for different predetermined periods of operation corresponding to one, two, or more letter-space movements of said carriage.

16. The combination with a carriage, of a motor for traversing said carriage, a driving train connecting said motor with said carriage, said train being normally inactive so as to prevent the movement of said carriage by said motor, and a series of keys for rendering said train active, each of said keys corresponding to a different number of letter-space movements of said carriage.

17. The combination with a carriage, of a motor for traversing said carriage, a driving train between said motor and said carriage, a key for enabling a movement of said carriage by said train to the right a given number of letter-spaces, and a key for enabling a movement of said carriage by said train to the left a given number of letter-spaces.

18. The combination with a carriage, of a motor for traversing said carriage, a driving train connecting said motor with said carriage, a series of keys for enabling selective movements of different magnitudes of said carriage by said train to the right, and a series of keys for enabling selective movements of different magnitudes of said carriage by said train to the left.

19. The combination with a carriage, of a motor for traversing said carriage, a driving train connecting said motor with said carriage, a series of keys for enabling movements of said carriage to the right, and a series of keys for enabling movements of said carriage to the left, each key in each series corresponding to a movement of different magnitude than every other key in the same series.

20. The combination with a carriage, of a motor for traversing said carriage, and a driving train connecting said motor with said carriage, said train including a drive shaft, a driven shaft, a gear on said driven shaft, a mutilated gear loosely mounted on said drive shaft and arranged to mesh with said gear on said driven shaft, a clutch for connecting said mutilated gear to said drive shaft, and a key for controlling the effectiveness of said clutch.

21. The combination with a carriage, of a motor for traversing said carriage, and a driving train connecting said motor with said carriage, said train including a drive shaft, a driven shaft, a pinion on said driven shaft, a mutilated gear on said drive shaft arranged to mesh with said pinion on said driven shaft, said mutilated gear being loosely mounted, a clutch for connecting said mutilated gear with said drive shaft, a key for rendering said clutch effective to connect said mutilated gear with said drive shaft, and a tripper for insuring the disconnection of said mutilated gear from said drive shaft after a predetermined movement of said mutilated gear with said drive shaft.

22. The combination with a carriage, of a motor for traversing said carriage, and a driving train between said motor and said carriage, said train including a drive shaft, a driven shaft, a pinion fixed on said driven shaft, a mutilated gear loosely mounted on said drive shaft, a clutch for connecting said mutilated gear to said drive shaft, means for causing a connection of said mutilated gear with said drive shaft through the intermediary of said clutch, and a tripper acting at the end of a complete revolution of said mutilated gear with said drive shaft to interrupt the activity of the train between said motor and said carriage by disconnecting parts of said clutch.

23. The combination with a carriage, of a motor for traversing said carriage, and tabulating means for connecting said motor with said carriage to space said carriage back and forth different definite amounts from any point in the movement of said carriage.

24. The combination with a carriage, of a motor for traversing said carriage, and a driving train for connecting said motor and said carriage, said train including a drive shaft, a driven shaft, a series of mutilated gears loosely mounted on said drive shaft, a series of pinions individual to said mutilated gears and secured to said driven shaft, a clutch individual to each of said mutilated gears for connecting it to rotate with said drive shaft, and a key for enabling the effective action of each of said clutches to connect the associated mutilated gear to said drive shaft, said mutilated gears having different numbers of teeth increasing successively by an equal increment.

25. The combination with a carriage, of a motor for traversing said carriage, and a driving train for connecting said motor and said carriage, said train including a drive shaft, a driven shaft, a series of mutilated gears loosely mounted on said drive shaft, a series of pinions individual to said mutilated gears and secured to said driven shaft, a clutch individual to each of said mutilated gears for connecting it to rotate with said drive shaft, a key for enabling the effective action of each of said clutches to connect the associated mutilated gear to said drive shaft, said mutilated gears having different numbers of teeth increasing successively by an equal increment, and a tripper for each of said clutches acting to render said clutches ineffective after a given movement of the associated mutilated gears with said drive shaft.

26. The combination with a carriage, of a motor for traversing said carriage, and a driving train for connecting said motor and said carriage, said train including a drive shaft, a driven shaft, a series of mutilated gears loosely mounted on said drive shaft, a series of pinions individual to said mutilated gears and secured to said driven shaft, a clutch individual to each of said mutilated gears for connecting it to rotate with said drive shaft, a key for enabling the effective action of each of said clutches to connect the associated mutilated gear to said drive shaft, said mutilated gears having different numbers of teeth increasing successively by an equal increment, a tripper for each of said clutches acting to render said clutches ineffective after a given movement of the associated mutilated gears with said drive shaft, and a bar universal to said trippers actuated at the connection of any of said mutilated gears with said drive shaft to insure the disconnecting action by said trippers.

27. The combination with a carriage, of a motor for traversing said carriage, and a driving train between said motor and said carriage, said train being normally inoperative to prevent the movement of said carriage by said motor and including means to render it operative, said means including a drive shaft, a driven shaft, a mutilated gear loosely mounted on said drive shaft, a pinion secured to said driven shaft and arranged to be engaged by said mutilated gear, a clutch for connecting said mutilated gear to rotate with said drive shaft, a tripper for manipulating the parts of said clutch to disconnect said mutilated gear from said drive shaft, a cam rotating with said mutilated gear, and a bar operated by said cam during the rotation of said mutilated gear with said drive shaft, said bar engaging said tripper to insure the disconnection of said mutilated gear by said tripper from said drive shaft.

28. The combination with a carriage, of a motor for traversing said carriage, and a driving train between said motor and said carriage, the train including a drive shaft, a driven shaft, a mutilated gear loosely mounted on said drive shaft, a pinion fixed on said driven shaft and engageable by said mutilated gear, a clutch connecting said mutilated gear with said drive shaft, a tripper for interrupting the connection of said mutilated gear with said drive shaft, a cam rotating with said mutilated gear, an arm operated by said cam, and a bar connected to said arm and engaging said tripper to positively insure said tripper being in its tripping position.

29. The combination with a carriage, of a motor for traversing said carriage, and a driving train connecting said motor with said carriage, said train being normally inoperative so as to prevent the traversing of said carriage by said motor and having means to render it operative, comprising a drive shaft, a driven shaft, a mutilated gear loosely mounted on said drive shaft, a pinion secured to said driven shaft and engageable by said mutilated gear, a clutch connecting said mutilated gear to rotate with said drive shaft, a tripper for interrupting the action of said clutch, and a spring for holding said tripper in its effective position.

30. The combination with a carriage, of a motor for traversing said carriage, and a driving train connecting said motor with said carriage, said train being normally inoperative so as to prevent the traversing of said carriage by said motor and having means to render it operative, comprising a drive shaft, a driven shaft, a mutilated gear loosely mounted on said drive shaft, a pinion secured to said driven shaft and engageable by said mutilated gear, a clutch connecting said mutilated gear to rotate with said drive shaft, a tripper for interrupting the action of said clutch, a spring for holding said tripper in its effective position, and positive means actuated at each rotation of said mutilated gear for insuring the disconnecting position of said tripper.

31. The combination with a carriage, of a motor for traversing said carriage, and a driving train connecting said motor with said carriage, said train including a drive shaft, a gear loosely mounted on said drive shaft, a clutch for connecting said gear to said drive shaft, a tripper for rendering said clutch ineffective to connect said gear with said drive shaft, a key for shifting said tripper to enable the connection of said gear with said drive shaft, and means actuated by each rotation of said gear with said drive shaft for positioning said tripper to render said clutch ineffective so as to enable the disconnection of said gear from said shaft.

32. The combination with a carriage, of a motor for traversing said carriage, and a driving train connecting said motor to said carriage, said train being normally inactive and including means for rendering it active to enable the traversing of said carriage by said motor, said means including a drive shaft, a gear loosely mounted on said drive shaft, a clutch connecting said gear with said drive shaft, a tripper for disengaging the parts of said clutch, a key for releasing said tripper to enable the connection of the parts of the clutch, a spring for returning said tripper to its disconnecting position at the release of said key, a cam rotated with said gear, and a bar actuated by said cam to positively insure the positioning of said tripper to disconnect the parts of the clutch after a predetermined movement of said gear with said shaft.

33. The combination with a carriage, of a motor for traversing said carriage, and a driving train connecting said motor with said carriage, said train including a drive shaft, a driven shaft, a gear fixed on said drive shaft, a gear loosely mounted on said driven shaft, and a clutch splined on said driven shaft for connecting said loosely-mounted gear with said driven shaft.

34. The combination with a carriage, of a motor for traversing said carriage, and a driving train connecting said motor with said carriage, said train including a drive shaft, a driven shaft, a gear fixed on said drive shaft, a gear loosely mounted on said driven shaft, a clutch splined on said driven shaft for connecting said loosely-mounted gear with said driven shaft, means for manipulating said clutch, and means for normally holding said clutch in a position corresponding to the disconnection of said loosely-mounted gear with respect to said driven shaft.

35. The combination with a carriage, of a motor for traversing said carriage, and a driving train connecting said motor to said carriage, said train including a drive shaft, a driven shaft, a gear fixed on said drive shaft, a gear loosely mounted on said driven shaft, a clutch splined on said driven shaft and arranged to connect said loosely-mounted gear with said driven shaft, a lever for manipulating said clutch, and a spring for holding said clutch normally in its disconnected position.

36. The combination with a carriage, of a motor for traversing said carriage, and a driving train connecting said motor with said carriage and including a drive shaft, a pair of driven shafts, a counter-shaft common to both of said driven shafts, gearing connecting said driven shafts with said counter-shaft so as to drive the latter in opposite directions, connections for joining said drive shaft with one of said driven shafts to rotate the said counter-shaft in one direction, and connections for joining said drive shaft with the other of said driven shafts to rotate said counter-shaft in the opposite direction.

37. The combination with a carriage, of a motor for traversing said carriage, and a driving train connecting said motor with said carriage, said train including a drive shaft, a pair of driven shafts, a counter-shaft, gearing connecting both of said driven shafts with said counter-shaft to enable the former to drive the latter in opposite directions, a pair of gears fixed on said drive shaft, a gear loosely mounted on each of said driven shafts and meshing with said first-mentioned gears, a clutch for connecting each of said loosely-mounted gears in fixed relation with respect to its driven shaft, and means for selectively manipulating said clutches.

38. The combination with a carriage, of a motor for traversing said carriage, and a driving train connecting said motor with said carriage, said train including a drive shaft, a pair of driven shafts, a counter-shaft, gearing connecting both of said driven shafts with said counter-shaft to enable the former to drive the latter in opposite directions, a pair of gears fixed on said drive shaft, a gear loosely mounted on each of said driven shafts and meshing with said first-mentioned gears, a clutch for connecting each of said loosely-mounted gears in fixed relation with respect to its driven shaft, spring means normally holding said clutches in their ineffective position, and levers for manipulating said clutches against the tension of said spring means to enable the operative joinder of said loosely-mounted gears with said shafts.

39. The combination with a carriage, of a motor for traversing said carriage, and a driving train connecting said motor with said carriage, said train including a drive shaft, a pair of abutting driven shafts, a counter-shaft, a bevel gear on said counter-shaft, a bevel gear secured on each of said driven shafts and meshing with said first-mentioned bevel gear to drive said counter-shaft, a gear loosely mounted on each of said driven shafts, a pair of gears fixed on said drive shaft and meshing with said loosely-mounted gears, a clutch for securing each of said loosely-mounted gears to its shaft, and means for manipulating said clutches.

40. The combination with a carriage, of a motor for traversing said carriage, a driving train for connecting said motor with said carriage, said train being normally inactive, means for rendering the train active for any undetermined period of operation to traverse said carriage any undetermined amount, and means for rendering said train active for a definite predetermined period of operation corresponding to a definite predetermined plural letter-space movement of said carriage.

41. The combination with a carriage, of a motor for traversing said carriage, a driving train for connecting said motor with said carriage, said train being normally inactive, clutching means for rendering said train active for any undetermined period of operation at a plurality of points to enable any undetermined movement of said carriage selectively to the right or left, and clutching means for rendering said train active for a definite predetermined period of operation at any one of a plurality of points corresponding to different definite predetermined movements of said carriage.

42. The combination with a carriage, of a motor for traversing said carriage, a driving train for connecting said motor with said carriage, said train being normally inactive, clutching means for rendering said train active for any undetermined period of operation at a plurality of points to enable any undetermined movement of said carriage selectively to the right or left, and clutching means for rendering said train active for a definite predetermined period of operation at any one of a plurality of points corresponding to different definite predetermined movements of said carriage selectively to the right or left.

43. The combination with a carriage, of a motor for traversing said carriage, and a driving train connecting said motor with said carriage, said train including a drive shaft, a pair of driven shafts, a counter-shaft driven by said driven shafts alternatively in opposite directions, a gear loosely mounted on each of said driven shafts, a pair of gears fixed on said drive shaft and meshing with said loosely-mounted gears, means for clutching said loosely-mounted gears to said driven shafts, a series of gears fixed on each of said driven shafts, a series of mutilated gears loosely mounted on said drive shaft and meshing with said fixed gears on said driven shafts, and means for selectively connecting any one of said mutilated gears to said drive shaft.

44. The combination with a carriage, of a motor for traversing said carriage, and a driving train connecting said motor with said carriage, said train including a drive shaft, a pair of driven shafts, a counter-shaft arranged to be alternatively driven by said driven shafts in opposite directions, a gear loosely mounted on each of said driven shafts, a clutch for connecting each of said gears to the corresponding driven shaft, a pair of gears on said drive shaft meshing with said loosely-mounted gears, a lever for manipulating each of said clutches, a spring for holding each of said clutches normally in its disconnected position, said levers being capable of manipulation against the tension of said springs to enable a continuous selective connection between said drive shaft and either of said driven shafts for any undetermined period of operation corresponding to an undetermined traversing movement of said carriage in either direction, a series of gears fixed on each of said driven shafts, a series of mutilated gears loosely mounted on said drive shaft and arranged to mesh with said fixed gears on said driven shafts, clutches for connecting said mutilated gears individually to said drive shaft, trippers normally rendering said last-mentioned clutches ineffective, and keys individual to each of said mutilated gears for actuating said trippers to enable the engagement of said clutches, to cause different predetermined movements of said carriage selectively to the right or left.

45. The combination with a carriage, of a motor for traversing said carriage, and means for enabling the traversing of said carriage by said motor, said means including a drive shaft, a driven shaft, connections between said driven shaft and said carriage, a gear loosely mounted on said driven shaft, a clutch for connecting said gear to said driven shaft, a gear fixed on said drive shaft and meshing with said loosely-mounted gear to enable said drive shaft to rotate said loosely-mounted gear, a lever for shifting said clutch to connect said loosely-mounted gear with said driven shaft to enable a continuous undetermined movement of said carriage by said motor, a series of mutilated gears loosely mounted on said drive shaft, each of said mutilated gears having a different number of teeth from its fellows corresponding to different periods of connection between said motor and said carriage, a series of gears fixed on said driven shaft and arranged to be driven by said mutilated gears on said drive shaft, clutches individual to each of said mutilated gears for connecting said mutilated gears to rotate with said drive shaft, and keys individual to said clutches to enable the effective operation of said clutches so as to afford selectively different predetermined movements of said carriage by said motor.

46. The combination with a carriage, of a motor for traversing said carriage, a driving train connecting said motor with said carriage, said train being normally inactive, controlling means for governing the activity of said train so as to enable said carriage to be traversed by said motor, and disconnecting means for freeing said carriage from subservience to said controlling means so as to render said carriage independent of the actuation of said controlling means.

47. The combination with a carriage, of a motor for traversing said carriage, a driving train connecting said motor with said carriage, said train being normally inactive, controlling mechanism for governing the activity of said train to enable the traversing of said carriage by said motor, and disconnecting means for interrupting the train at another point to render said carriage independent of said motor and said controlling mechanism.

48. The combination with a carriage, of a motor for traversing said carriage, a driving train for connecting said motor with said carriage, said train being normally inactive, a plurality of clutches for controlling the effectiveness of said train to govern the character of traversing movement of said carriage by said motor, and a clutch for determining the subservience of said carriage to said motor irrespective of said first-mentioned clutches.

49. The combination with a carriage, of a motor for traversing said carriage, a driving train for connecting said motor with said carriage, said train being normally inactive, a plurality of clutches for controlling the effectiveness of said train to govern the character of traversing movement of said carriage by said motor, and a clutch located intermediate said first-mentioned clutches and said carriage to determine the effectiveness of said train independent of said first-mentioned clutches.

50. The combination with a carriage, of a motor for traversing said carriage, a driving train connecting said motor with said carriage, said train being normally ineffective to drive said carriage, a series of keys for rendering said train effective to drive said carriage and for determining the kind of drive, and another key for rendering said carriage independent of the control of said first-mentioned keys.

51. The combination with a carriage, of a motor for traversing said carriage, a series of keys for enabling back and forth traversing movements of said carriage by said motor of different definite predetermined magnitudes, and another key for rendering said carriage independent of said first-mentioned keys.

52. The combination with a carriage, of a motor for traversing said carriage, and means for connecting said carriage with said motor, to selectively traverse said carriage a given amount corresponding to a definite predetermined plural number of letter-spaces, or an indefinite amount.

53. The combination with a carriage, of a motor for traversing said carriage, a series of character keys, and a driving train for connecting said motor with said carriage, said train being normally inactive so as to prevent the movement of said carriage by said motor and including a drive shaft, a driven shaft, a mutilated gear loosely mounted on said drive shaft, a gear fixed on said driven shaft and arranged to be driven by said mutilated gear, and connecting means operated by any of said character keys for joining said mutilated gear to rotate with said drive shaft.

54. The combination with a carriage, of a motor for traversing said carriage, a rack on said carriage, a pinion meshing with said rack to traverse said carriage, a shaft for said pinion, a shaft abutting against said first-mentioned shaft, driving connections between said last-mentioned shaft and said motor, and clutching connections between said abutting shafts.

55. The combination with a carriage, of a motor for traversing said carriage, a rack on said carriage, a pinion meshing with said rack, a shaft for said pinion, a shaft abutting end to end with said first-mentioned shaft, clutching means for joining said shafts together, a counter-shaft connected to drive said last-mentioned shaft, a pair of driven shafts connected to drive said counter-shaft, a drive shaft for driving said pair of driven shafts, and selective connections between said drive shaft and said driven shafts.

56. The combination with a carriage, of a motor for traversing said carriage, and a driving train between said motor and said carriage, said train including a rack on said carriage, a pinion meshing with said rack, a shaft for said pinion, a ratchet wheel on said shaft, and a justifying detent engaging said ratchet wheel to accurately determine the position of said carriage for each letter space after the movement of said carriage by said motor.

57. The combination with a carriage, of a motor for traversing said carriage, a driving train leading from said motor, driving connections between said train and said carriage, said train being normally inactive and having means to render the same effective, comprising a drive shaft, a driven shaft, a gear loosely mounted on one of said shafts, a gear meshable with said first-mentioned gear and fixed on the other of said shafts, a clutch for connecting said loosely-mounted gear to its shaft, a tripper for said clutch and a key for actuating said tripper.

58. The combination with a carriage, of a motor for traversing said carriage, a driving train leading from said motor, driving connections between said train and said carriage, said train being normally inactive and having means to render the same effective, comprising a drive shaft, a driven shaft, a mutilated gear loosely mounted on one of said shafts, a gear fixed on the other of said shafts, and a clutch for connecting said loosely-mounted gear to its shaft.

59. The combination with a carriage, of a set of type actions including a bank of character keys, driving mechanism for traversing said carriage back and forth, a series of tabulating keys to the right of said bank of character keys controlling said driving mechanism for traveling movements of said carriage to the right, and a series of tabulating keys to the left of said bank of character keys controlling said driving mechanism for traveling movement of said carriage to the left.

60. The combination with a traveling carriage, of a series of type actions including a bank of character keys, driving mechanism for traversing said carriage back and forth, a lever at the right of said bank of character keys controlling said driving mechanism for movements of said carriage to the right, and a lever at the left of said bank of character keys controlling said driving mechanism for movements of said carriage to the left.

61. The combination with a traveling carriage, of driving mechanism for traversing said carriage, a series of keys for controlling said driving mechanism, and means subservient to said keys whereby at the actuation of one of said keys said carriage will be traversed by said driving mechanism for a period of operation corresponding to one, two, or three, etc., units according to the key actuated.

62. The combination with a carriage and a carriage-driving motor, of a normally-inactive driving train connecting said motor to said carriage, a series of keys, and carriage-feeding mechanism under the control of said keys and connected to said driving train to render the latter active to drive said carriage from said motor, said mechanism including selectively-operable means for enabling different keys to control the activity of said train to drive said carriage different definite predetermined pluralities of steps at a time.

63. The combination with a traveling carriage, of driving mechanism for traversing said carriage back and forth, said driving mechanism being normally inactive so as to be ineffective to traverse said carriage, and a series of keys for rendering said driving mechanism active for predetermined different periods of operation corresponding to the keys actuated, some of said keys controlling traveling movements of said carriage to the right, and some of said keys controlling traveling movements of said carriage to the left.

64. The combination with a traveling carriage, of driving mechanism for traversing said carriage back and forth, controlling mechanism for governing said driving mechanism for predetermined movements of said carriage to the right, controlling mechanism for governing said driving mechanism for undetermined indefinite movements of said carriage to the right, controlling mechanism for governing said driving mechanism for predetermined definite movements of said carriage to the left, and controlling mechanism for governing said driving mechanism for undetermined indefinite movements of said carriage to the left.

65. The combination with a carriage, of a motor for traversing said carriage, a driving train between said motor and said carriage, said train being normally inactive, and connecting means for rendering said train active for a period of operation corresponding to a definite plural number of letter-space movements of the carriage.

66. The combination with a carriage, of a motor for traversing said carriage, a driving train connecting said motor with said carriage, said train being normally inactive, so as to prevent movement of said carriage by said motor, and two series of keys for rendering said train active, each key of one series corresponding to a different definite number of letter-space movements of the carriage in one direction, and each key of the other series corresponding to a different definite number of letter-space movements of the carriage in the opposite direction.

67. The combination with a carriage, of a motor for traversing said carriage, a normally-inactive driving train between said motor and said carriage, and a key for throwing said train into action to drive said carriage a predetermined plural number of letter-space movements.

68. The combination with a carriage, of a motor for traversing said carriage, a normally-inactive driving train between said motor and said carriage, a key for throwing said train into action to drive said carriage a predetermined plural number of letter-space movements in one direction, and a separate key for throwing said train into action to drive said carriage a predetermined plural number of letter-spaces in the opposite direction.

69. The combination with a carriage, of a motor for traversing said carriage, a normally-inactive driving train between said motor and said carriage, a key for throwing said train into action to drive said carriage a predetermined plural number of letter-space movements in one direction, and a separate key for throwing said train into action to drive said carriage exactly the same number of letter-spaces as the first-named key but in the opposite direction.

70. The combination with a carriage, of a motor for traversing said carriage, a normally-inactive driving train connecting said motor to said carriage, a member for throwing said train into action to drive said carriage in one direction only and to the extent of a definite predetermined number of letter-spaces, and a separate member for throwing said train into action to drive said carriage in the opposite direction only and to the extent of a definite predetermined number of letter-spaces.

71. The combination with a carriage, of a motor for traversing said carriage, a normally-inactive driving train connecting said motor to said carriage, a member for throwing said train into action to drive said carriage in one direction only and to the extent of a definite predetermined number of letter-spaces, and a separate member for throwing said train into action to drive said carriage exactly the same number of letter-spaces as the first-named member but in the opposite direction only.

72. The combination with a carriage, of a motor for traversing said carriage, a series of keys for definitely enabling movements of the carriage of selective predetermined magnitudes by said motor in normal direction only, a separate series of keys for definitely enabling movements of said carriage of selective predetermined magnitudes by said motor in reverse direction only, and a key for rendering said carriage independent of both series of keys.

73. The combination with a carriage, of a motor whereby the carriage may be either advanced or returned, mechanism for selectively feeding said carriage either forwardly or backwardly different definite predetermined pluralities of letter-spaces at a time, and manually-controlled means for causing said carriage to be driven either forwardly or backwardly by said motor independently of said carriage-feeding mechanism, and to variable extents as determined by the operator.

74. The combination with a carriage, of a motor, a driving train leading from said motor to said carriage, a series of character keys associated with said train for rendering the latter effective to traverse said carriage when one of said character keys is actuated, and a special key for disconnecting said carriage from said train, to render the train ineffective to traverse said carriage at an actuation of a character key.

75. The combination with a carriage, a motor, and a driving train leading from said motor to said carriage and including a normally-coupled clutch, of a series of character keys associated with said train for effecting a traverse thereby of said carriage when one of said keys is actuated, and a special key for uncoupling said clutch, to render said train ineffective to traverse the carriage on the actuation of a character key.

76. The combination with a carriage, and a motor, of a key for enabling a definite, predetermined traverse of said carriage by said motor in one direction only and to the extent of a single letter-space only, and a separate key for enabling a definite, predetermined traverse of said carriage by said motor in the opposite direction only and to the extent of a single letter-space only.

77. The combination with a carriage, and a motor, of a key for enabling a traverse of said carriage by said motor in one direction only and to the definite extent of a predetermined number only of letter-spaces, and a separate key for enabling a predetermined traverse of said carriage by said motor in the opposite direction only and to the definite extent of a predetermined number only of letter-spaces.

78. The combination with a carriage, and a motor of a key for enabling a traverse of said carriage by said motor in one direction only and to the definite extent of a predetermined number only of letter-spaces, and a separate key for enabling a traverse of said carriage by said motor in the opposite direction only and to exactly the same extent only as the first-named key.

79. The combination with a carriage and mechanism for traversing the same in either direction, of tabulating mechanism for determining the position of said carriage, including a separate series of tabulating keys for determining the extent of movement of the carriage in each direction, and locking means for preventing the actuation of more than one of the total number of tabulating keys at a time.

80. The combination with a carriage and mechanism for traversing the same in either direction, of tabulating mechanism for determining the position of said carriage, including a separate series of tabulating keys for determining the extent of movement of the carriage in each direction, locking means for preventing the actuation of more than one of the total number of tabulating keys at a time, and an element individual to each tabulating key and actuated with the actuation thereof to engage said locking means, said locking means including a guide and a series of rollers loosely mounted in said guide, the aggregate play between said rollers being just sufficient to admit of the intrusion of solely one of said elements between a pair of said rollers.

SAMUEL E. CARLIN.

Witnesses:
CHARLES S. WILSON,
ALLENA OFFUTT.

Copies of this patent may be obtained for five cents each, by addressing the "Commissioner of Patents, Washington, D. C."